(12) United States Patent
Solmeyer et al.

(10) Patent No.: US 10,801,840 B1
(45) Date of Patent: Oct. 13, 2020

(54) FOUR PORT ATOMIC GYROSCOPE

(71) Applicant: Honeywell International Inc., Morris Plains, NJ (US)

(72) Inventors: Neal Eldrich Solmeyer, Edina, MN (US); Karl D. Nelson, Plymouth, MN (US); Matthew Wade Puckett, Scottsdale, AZ (US); Robert Compton, Loretto, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/521,346

(22) Filed: Jul. 24, 2019

(51) Int. Cl.
    *G01C 19/62* (2006.01)
(52) U.S. Cl.
    CPC .................... *G01C 19/62* (2013.01)
(58) Field of Classification Search
    CPC ........ G01C 19/00; G01C 19/58; G01C 19/62; G01C 19/64; G01C 19/66; G01C 19/72; G01C 19/721; G01C 19/722
    See application file for complete search history.

(56) References Cited

U.S. PATENT DOCUMENTS

| | | | |
|---|---|---|---|
| 7,245,803 B2 | 7/2007 | Gunn, III et al. | |
| 9,766,071 B2* | 9/2017 | Compton | G01C 19/60 |
| 10,571,269 B1* | 2/2020 | Solmeyer | H03L 7/26 |
| 2015/0015251 A1 | 1/2015 | Bulatowicz | |
| 2016/0377436 A1* | 12/2016 | Compton | G01C 19/60 |
| | | | 356/460 |

FOREIGN PATENT DOCUMENTS

| | | |
|---|---|---|
| CN | 102927978 B | 12/2014 |
| WO | 2015189614 A1 | 12/2015 |

OTHER PUBLICATIONS

Campbell et al., "Rotation sensing with trapped ions", Journal of Physics B: Atomic, Molecular and Optical Physics 50 064002, 2017, pp. 1-9, IOP Publishing.
Chiow et al., "102hk Large Area Atom Interferometers", Physical Review Letters 107, 130403, Sep. 23, 2011, pp. 1-5, American Physical Society.
Cronin et al., "Atom Interferometers", Rev. Mod. Phys, 81, 1051, Jul. 28, 2009, pp. 1-82, American Physical Society.
Dieckmann et al., "Two-dimensional magneto-optical trap as a source of slow atoms", Physical Review A, Nov. 1998, pp. 3891-3895, vol. 58, No. 5, The American Physical Society.
Giltner et al., "Atom Interferometer Based on Bragg Scattering from Standing Light Waves", Physical Review Letters, Oct. 2, 1995, pp. 2638-2641, vol. 75, No. 14, The American Physical Society.
Goban et al., "Demonstration of a state-insensitive, compensated nanofiber trap", Physical Review Letters 109, 033603, 2012, pp. 1-7, American Physical Society.

(Continued)

*Primary Examiner* — Jonathan M Hansen
(74) *Attorney, Agent, or Firm* — Fogg & Powers LLC (57) ABSTRACT

Apparatuses and methods for a four port atomic gyroscope are disclosed. Because of its four ports, a four port atomic gyroscope has an output separate from an input so as to increase sensitivity of the atomic gyroscope. Thus, smaller changes in rotation rate around a center axis of an optical waveguide loop of the four port atomic gyroscope can be detected.

20 Claims, 5 Drawing Sheets

(56) References Cited

OTHER PUBLICATIONS

Guarrera et al., "Distributed quasi-Bragg beam splitter in crossed atomic waveguides", Scientific Reports, Jul. 6, 2017, pp. 1-12.

Gupta et al., "Bose-Einstein condensation in a circular waveguide", Physical Review Letters 95, 143201, 2005, pp. 1-5, American Physical Society.

Hammes et al., "Evanescent-wave trapping and evaporative cooling of an atomic gas near two-dimensionality", Physical Review Letter 90, 173001, 2003, pp. 1-4.

Kasevich et al., "Atomic Interferometry Using Stimulated Raman Transitions", Physical Review Letters, Jul. 8, 1991, pp. 181-184, vol. 67, No. 2, The American Physical Society.

Lee et al., "Integrated optical dipole trap for cold neutral atoms with an optical waveguide coupler", New Journal of Physics 15, Apr. 9, 2013, pp. 1-15, IOP Publishing Ltd.

Meng et al., "Near-Ground-State Cooling of Atoms Optically Trapped 300 nm Away from a Hot Surface", Physical Review X 8, 031054, 2018, pp. 1-9, American Physical Society.

Monroe et al., "Resolved-Sideband Raman Cooling of a Bound Atom to the 3D Zero-Point Energy", Physical Review Letters, Nov. 27, 1995, pp. 4011-4014, vol. 75, No. 22, The American Physical Society.

Ovchinnikov et al., "An Atomic trap based on evanescent light waves", J.Phys. B: At. Mol. Opt. Phys. 24, 1991, pp. 3173-3178, IOP Publishing Ltd.

Solano et al., "Optical Nanotibers: a new platform for quantum optics", Advances in Atomic, Molecular, and Optical Physics, 2017, pp. 1-65.

Wright et al., "Toroidal Optical Dipole Traps for Atomic Bose-Einstein Condensates Using Laguerre-Gaussuan Beams", Physical Review A 63, 013608, 2000, pp. 1-16, American Physical Society.

Xin et al., "An atom interferometer inside a hollow-core photonic crystal fiber", Science Advances 4, Jan. 19, 2018, pp. 1-7.

\* cited by examiner

FOUR PORT ATOMIC GYROSCOPE

BACKGROUND

The navigation market is driving towards smaller gyroscopes without sacrificing scale factor or stability. Atomic gyroscopes provide high flux of the signal-generating object (for high signal to noise ratio (SNR)) and good stability by referencing the scale factor to the wavelength of light. Atomic gyroscopes are navigation instruments used to measure rotation rates about an axis of rotation. Utilizing the Sagnac effect, a shift in phase of an atomic wavefunction is calculated. The rotation rate of the gyroscope is proportional to the phase shift of the atomic wavefunction.

U.S. Pat. No. 9,766,071 (hereinafter the "'071 patent") discloses diverging waveguide atomic gyroscopes. The '071 patent is incorporated by reference herein in its entirety. The '071 patent discloses trapping and cooling atoms so that the atoms move along a surface of a waveguide terminated by a waveguide loop, initializing a state of the atoms, and splitting the wavefunction of the atoms into two halves which travel in different directions around the waveguide loop. The components of the wavefunction travelling in each waveguide receive a relative phase difference based upon rotation around the center axis of the waveguide loop. Both halves are combined in the waveguide. The relative populations of both halves of the atomic wave function are characterized to determine rotation rate around an axis of the loop.

Thus, the waveguide loop has a single port into which the wave functions enter the loop and from which the wave functions exit the loop. Optical signals which are used to trap the atoms on the surface of the waveguide can produce detrimental phase shifts that interfere, e.g. due to a differential Stark shift, with the characterizations of the relative populations of the halves of the atomic wave function. As a result, undesirable bias error can result in measurements of the gyroscope.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

SUMMARY

A method is provided. The method comprises: introducing a stream of alkali atoms to at least one exterior surface of an input optical waveguide; creating a red blue optical evanescent trap above the at least one exterior surface of the input optical waveguide by introducing a red-detuned optical signal and a blue-detuned optical signal in the input optical waveguide, where the stream of the alkali atoms move parallel to a center axis of the input optical waveguide and are suspended in the red blue optical evanescent trap; setting the electronic states of the alkali atoms in the stream of the alkali atoms to a known electronic ground state configuration by applying, orthogonally to the stream of alkali atoms, a pump optical beam; measuring a first amplitude of light emitted from the stream of the alkali atoms when the atomic states are set by the pump optical beam; splitting quantum mechanical wavefunctions of the alkali atoms of the stream of alkali atoms, by applying at least one Bragg optical beam comprising Bragg optical pulses to the stream of the alkali atoms, into at least a stream of a first wavefunction half moving in the red blue optical evanescent trap above at least one exterior surface of an optical waveguide loop in a first direction, and a stream of a second wavefunction half moving in the red blue optical evanescent trap above the at least one exterior surface of an optical waveguide loop in a second direction, where the second direction is opposite the first direction; recombining the first and second wave functions, after each has traversed the optical waveguide loop, into recombined alkali atoms; emitting, to an output optical waveguide, a stream of some of the recombined alkali atoms; applying the optical pump signal or another optical measurement signal, to the stream of the some of the recombined alkali atoms moving in the red blue optical evanescent trap above and along at least one exterior surface of the output optical waveguide; measuring a second amplitude of light emitted from the stream of the some of the recombined alkali atoms, moving in the red blue optical evanescent trap above and along the at least one exterior surface of the output optical waveguide, when the optical pump signal or another optical measurement signal is applied; and determining a rotation rate around a center axis of the optical waveguide loop based upon the measured first amplitude and the measured second amplitude.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A four port atomic gyroscope is subsequently described. The four port atomic gyroscope using Bragg interferometry overcomes the above-referenced problem. Atomic interferometers may be used to perform inertial sensing. Within the class of atom interferometers that are used for inertial sensing, there are at least two different approaches: (1) a free-space approach where atoms are launched or held in free space and probed with lasers; and (2) a waveguide approach where atoms are shuttled along a waveguide. In either case, interferometry can be performed on the atoms for rotation sensing.

Figure 1:
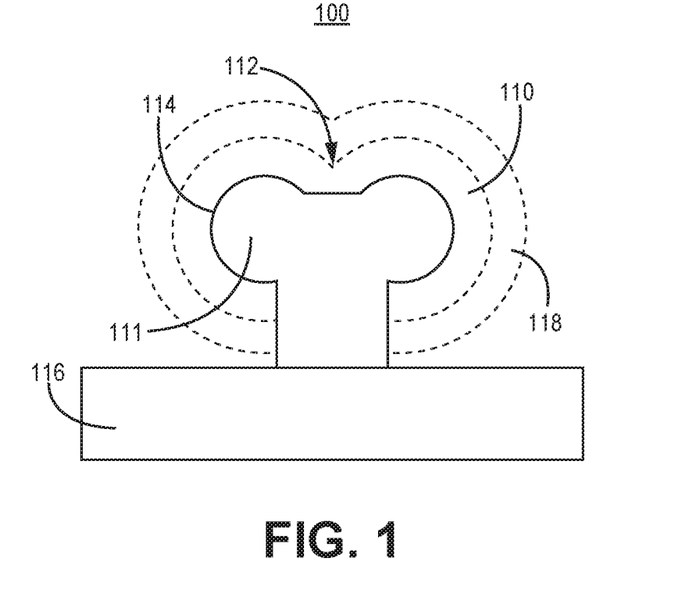
FIG. 1 is a cross sectional diagram illustrating one embodiment of a waveguide having a waveguide potential energy minimum for atoms above the waveguide surface.

FIG. 1 is a cross sectional diagram illustrating one embodiment of an optical waveguide 100 having a potential minimum (or a well) 112 for atoms above an exterior surface 114 of the optical waveguide 100. The waveguides described herein can be magnetic or optical; however, optical waveguides are illustrated for pedagogical purposes.

In exemplary embodiments, the waveguide 100 is a planar optical waveguide on a substrate 116 which guides atoms above the substrate 116. In exemplary embodiments, the substrate 116 is for example a silicon substrate; however other substrates may be used. The substrate 116 and the optical waveguide 100 may comprise, in part or in whole, an integrated circuit. In exemplary embodiments, the waveguide 100 on the substrate is a silicon nitride ridged waveguide. However, waveguides formed by other materials using different structures may be used. Alternatively, the optical waveguide 100 may be an optical fiber; in such a case the substrate 116 is not required.

With the proper choice of two different optical signals traveling down the optical waveguide, evanescent fields, of those optical signals, about the optical waveguide 100 becomes a trap for atoms traveling above the optical waveguide 100, guiding the atoms along a path above the waveguide 100, but without touching the physical surface 104 of the optical waveguide 100. In exemplary embodiments, a red-detuned optical signal is generated (e.g. using a red-detuned laser detuned below an atomic resonant frequency of the atoms positioned above the optical waveguide 100) and a blue-detuned optical signal is generated (e.g. using a blue-detuned laser detuned above the atomic resonant frequency of the atoms positioned above the optical waveguide 100). Each resonant frequency of the alkali atoms is a frequency at which optical energy causes electrons of the alkali atoms to change electronic states. The potential minimum or the well formed by the evanescent fields of the red-detuned optical signal and the blue-detuned optical signal may be also referred to herein as a red blue optical evanescent trap.

An evanescent field of the red-detuned optical signal is attractive to the atoms (and thus is also referred to as an attractive evanescent field 118), so that it creates the potential minimum that pulls in the atoms toward the optical waveguide 100. In contrast, an evanescent field of the blue-detuned optical signal is repulsive to the atoms (and thus is also referred to as a repulsive evanescent field 110), so it pushes the atoms away from the optical waveguide 100.

In exemplary embodiments, the attractive evanescent field 118 created by the red-detuned optical signal and the repulsive evanescent field 110 created by the blue-detuned optical signal extend above the exterior surface 114 of the optical waveguide 100. The evanescent field of the blue-detuned optical signal decays faster than the evanescent field of the intensity (or power) of the red-detuned optical signal. In exemplary embodiments, both the attractive evanescent field 108 and the repulsive evanescent field 110 extend above the exterior surface 114 of the optical waveguide 100 by a few hundreds of nanometers. The intensity of each of the attractive evanescent field 118 and the repulsive evanescent field 110 decreases with distance above the exterior surface 114 of the waveguide 100. This causes the atoms above the exterior surface 114 of the optical waveguide 100 to experience both the attractive force of the attractive evanescent field 118 created by the red-detuned optical signal and the repulsive force of the repulsive evanescent field 110 created by the blue-detuned optical signal. Were only the attractive evanescent field 118 generated by the red-detuned optical signal present, the atoms would be pulled down onto the exterior surface 114 of the waveguide 100 where the atoms would stick, bounce away, or otherwise be lost. The blue-detuned optical signal (the repulsive optical signal) has a repulsive evanescent field 110 that does not extend as far above the exterior surface 114 of the optical waveguide 100 as the attractive evanescent field 118 created by the red-detuned optical signal (the attractive optical signal). The atoms get pulled toward the surface 104 of the waveguide 100 by the attractive evanescent field 118 created by the red-detuned optical signal. The atoms are also pulled towards the center of the attractive evanescent field 118 created by the red-detuned optical signal to provide a trapping potential transverse to the substrate surface; thus, the atoms are trapped in two orthogonal directions. As the atoms get closer to the exterior surface 114 of the optical waveguide 100, the atoms start to experience the repulsive force of the repulsive evanescent field 110 created by the blue-detuned optical signal that pushes the atoms away from the exterior surface 114 of the optical waveguide 100. In response to these attractive and repulsive forces, the atoms find the red blue optical evanescent trap 112 above the surface 104 of the optical waveguide 100. In exemplary embodiments, the red blue optical evanescent trap 112 is fifty to three hundred nanometers above the exterior surface 114 of the optical waveguide 100; however, this range is exemplary, and the range of distance may vary depending upon the atom, e.g. alkali atom, used, the design of the four port atomic gyroscope, and/or the intensities or frequencies of the red-detuned and blue-detuned optical signals.

In exemplary embodiments, wavelengths of the red-detuned optical signal and the blue-detuned optical signal differ by many nanometers and are both relatively far detuned from the atomic resonance. In the case of Rubidium alkali atoms, a resonance associated with a change in electron energy levels of a rubidium atom has a wavelength of 780 nm. In this case, the blue-detuned optical signal might be approximately 632 nanometers, which is a convenient diode wavelength. In contrast, the red-detuned optical signal might be approximately 852 nanometers, which is another available diode wavelength. Note, other wavelengths may be used.

In exemplary embodiments, the AC Stark Effect shifts the energy of the atoms downward for the red-detuned optical signal (having a lower frequency than resonance) and it shifts the atomic energy upward for the blue-detuned optical signal (having a higher frequency than resonance). With both the 852 nm and 632 nm (or other appropriate) sources coupled into the waveguide 100, the blue-detuned light raises the atomic energy and pushes the atoms away from the exterior surface 114 of the optical waveguide 100 while red-detuned light pulls the atoms in toward the exterior surface 114 of the optical waveguide 100. The optical (or light) sources can be set up to act in such a way so as to create the red blue optical evanescent trap about the exterior surface 114 that suspends the atoms above the exterior surface 114 of the optical waveguide 100 far enough away from the exterior surface 114 of the optical waveguide 100 so that the atoms do not touch, bump against, or scatter against the exterior surface 114 of the optical waveguide 100. Instead, the atoms move longitudinally above the surface 104 of the waveguide 100, so that they are confined by the optical potential but are free to move along the direction of the optical waveguide 100.

Figure 2A:
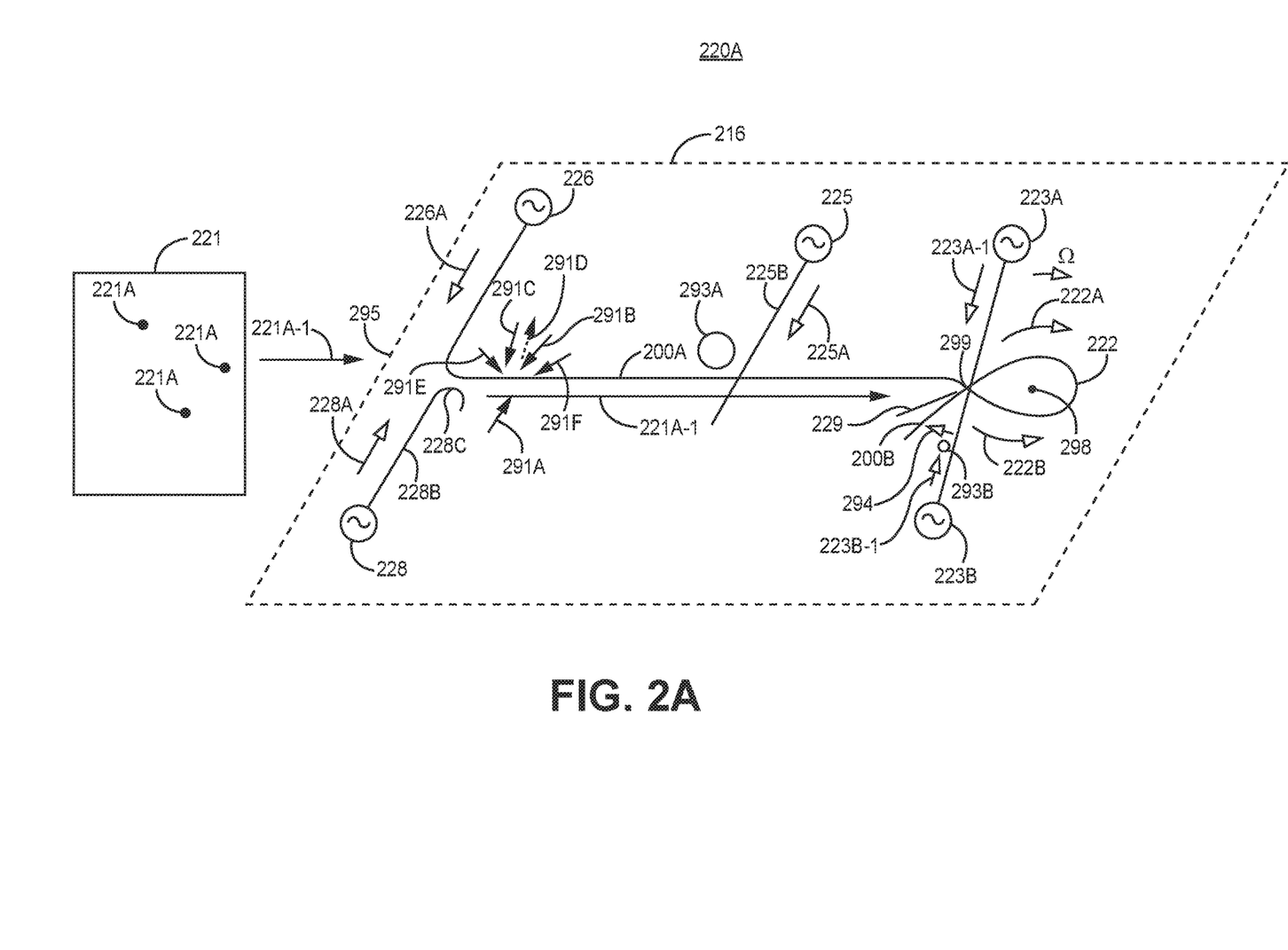
FIG. 2A illustrates a block diagram of one embodiment of a four port atomic gyroscope.

FIG. 2A illustrates a block diagram of one embodiment of a four port atomic gyroscope 220A. The term "four port" refers to the two ports of an optical waveguide loop 222 (and thus an open optical waveguide loop) and two other ports: second end of a first input optical waveguide 200A and an end, e.g. an input end or port, of an output optical waveguide 200B. These four ports will be subsequently illustrated. In exemplary embodiments, the optical waveguide loop 222 has a circular circumference centered around a center axis 298.

The illustrated embodiment of the four port atomic gyroscope 200 comprises an atomic trap 221, the first input optical waveguide 200A, the output optical waveguide 200B, the optical waveguide loop 222, a red-detuned laser 226 configured to generate the red-detuned optical signal (or beam) 226A, the blue-detuned laser 228 configured to generate the blue-detuned optical signal (or beam) 228A, a second input optical waveguide 228B, a first Bragg laser 223A configured to generated a first Bragg optical signal 223A-1, a second Bragg laser 223B configured to generate a second Bragg optical signal 233B-1, and an optical baffle 229.

In exemplary embodiments, the red-detuned laser 226 (and the red-detuned optical signal 226A) can be coupled to the first input optical waveguide 200A; the blue-detuned laser (and the blue-detuned optical signal 228A) can be coupled to a second input optical waveguide 228B, and coupled to the first input optical waveguide 200A by an optical coupler 228C. However, alternatively, the blue-detuned laser 228 can be coupled to the first input optical waveguide 200A, and the red-detuned laser 226 can be coupled to the second input optical waveguide 228B.

Optionally, all or some of the aforementioned components are implemented in a substrate 216, e.g. an integrated circuit. The substrate may be silicon or another material such as glass or other optical clear material (e.g. an optical window). If a substrate 216 is used, some or all of the waveguides, coupler(s), and the optical waveguide loop 222 may be implemented with planar optical waveguides fabricated on the substrate.

Alternatively, one or more of the foregoing devices may be implemented with other forms of waveguides such as optical fiber. Further, e.g. if no substrate 216 is used, some optical waveguides (except for the first input optical waveguide 200A, the output optical waveguide 200B, and optical waveguide loop 222) need not be used and may be replaced by free space. These include for example: waveguides carrying one or more cooling optical signals (if used), a pump optical signal, and/or a measurement optical signal (if used).

In other exemplary embodiments, the red-detuned optical signal 226A and the blue-detuned optical signal 226B are coupled into the first input optical waveguide 200A in other various ways, as shown in the '071 patent. For example, the red-detuned optical signal 226A and the blue-detuned optical signal 226B may be injected into an input 200A-1 of the first input optical waveguide 200A; thus, an optical coupler 228C (and possibly a second input optical waveguide 228B) are not required. Alternatively, the red-detuned optical signal 226A and/or the blue-detuned optical signal 226B may be coupled to the first input optical waveguide 200A by one or more directional optical couplers, e.g. respectively by red-detuned directional optical coupler(s) and/or blue-detuned directional optical coupler(s). Further, alternatively, one directional optical coupler may be used to couple both signals. Note, although, the red-detuned optical signal 226A and the blue-detuned optical signal 226B are described above as being injected and/or coupled into the first input optical waveguide 200A, each of such optical signals may alternatively be coupled and/or injected into the output optical waveguide 200B and/or the optical waveguide loop 222.

Regardless of how they are coupled, the red-detuned optical signal 226A and the blue-detuned optical signal 228A travel throughout the first input optical waveguide 200A, the output optical waveguide 200B, and the optical waveguide loop 222—and create a red blue optical evanescent trap. Thus, the red blue optical evanescent trap exists above exterior surfaces of at least a portion of each of the first input optical waveguide 200A, the output optical waveguide 200B, and the optical waveguide loop 222.

The atomic trap 221 contains alkali atoms 221A which emits a continuous stream 221A-1 of alkali atoms 221A (moving with a velocity distribution based upon the alkali atoms' temperature) toward the input 200A-1 of the input optical waveguide. Upon reaching the first input optical waveguide 200A, the alkali atoms 221A travel, outside of exterior surfaces, from the first input optical waveguide 200A towards the optical waveguide loop 222.

Returning to FIG. 2A, the alkali atoms 221A may be one of, e.g. rubidium or cesium atoms; however, the alkali atoms 221A may be one of any other type of alkali atoms. If for example, rubidium atoms are used in the atomic trap 221, then a resonant frequency associated with a change in electron energy levels of rubidium has a wavelength of 780 nm. Thus, the red-detuned optical signal 226A, the blue-detuned optical signal 228A, and the Bragg optical signal 223A are configured to have a wavelength at or near the resonant frequency associated with a change in electron energy levels of the alkali atoms 221A in the atomic trap 221.

The atomic trap 221 may be, e.g. a magneto-optical trap or an optical dipole. The atomic trap 221 cools and concentrates, e.g. in a Bose-Einstein condensate or cold thermal ensemble, the alkali atoms 221A. If the atomic trap 102 is a magneto-optical trap, then the atomic trap 102 can be enabled and disabled by respectively activating and deactivating three orthogonal optical signals generated by laser(s), directed at the center of the atomic trap 221 and a DC magnetic field—in the atomic trap 221; the wavelength of the orthogonal optical signals is the wavelength at or near the resonant frequency associated with a change in electron energy levels of the alkali atoms 221A in the atomic trap 221.

The stream 221A-1 of alkali atoms 221A may be coupled to the outside of the exterior surfaces of the first input optical waveguide 200A in different ways. In exemplary embodiments, the stream 221A-1 may be directed to an exposed first end (or port) 295 (e.g. at an edge of the substrate 216) of the first input optical waveguide 200A which is opposite a second end (or port) of the first input optical waveguide 200A coupled to the optical waveguide loop 222. However, this may not efficiently capture alkali atoms in the red blue optical evanescent trap at the first input optical waveguide 200A. Therefore, other techniques can be used to enhance the efficiency of transfer of alkali atoms 221A to the red blue optical evanescent trap at the input optical waveguide. By enhancing transfer efficiency interferometer, and thus gyroscope, efficiency and sensitivity can be increased.

Figure 2B:
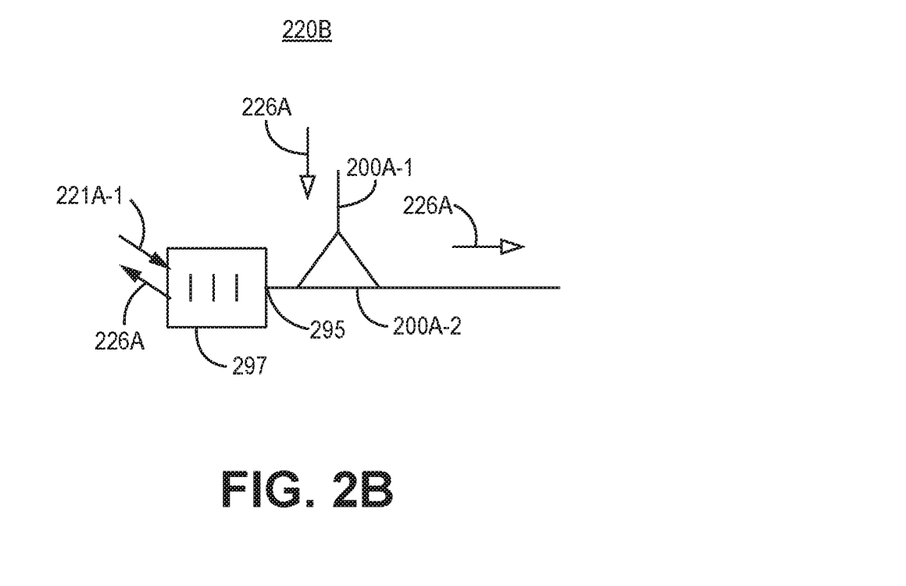
FIG. 2B illustrates diagram of one embodiment of a portion of the four port atomic gyroscope.

FIG. 2B illustrates diagram of one embodiment of a portion of the four port atomic gyroscope 220B. FIG. 2B illustrates embodiments for enhancing transfer efficiency of the stream of the alkali atoms to the red blue optical evanescent trap about a portion 200A-2 of the input optical waveguide. These techniques can be used in other gyroscope implementations. Firstly, the red-detuned optical signal 226A is coupled into the first input optical waveguide 200A so that it propagates in both directions. This may be accomplished different ways. For example, an end of a first portion 200A-1 of the first optical waveguide 200A is split into two where each split end is directly connected to the second portion 200A-2 of the first optical waveguide 200A. Alternatively, the end portion of the first portion 200A-1 of the first optical waveguide 200A is coupled to the second portion 200A-1 of the first optical waveguide 200A by a bi-directional optical coupler (e.g. formed by two back to back directional optical couplers). As a result, the red-detuned optical signal 226A is directed in both directions of the second portion 200A-1 of the first input optical waveguide 200A (e.g. towards the exposed end 295 of the second portion 200A-2 (e.g. at the edge of the substrate 216) which is configured to receive the stream 221A-1, and towards the optical waveguide loop 222. An emitted (or diverging) field of the red-detuned optical signal 226A emitted from the end of the second portion 200A-2 attracts the alkali atoms 221A towards an exposed end 295 of the first input optical waveguide 200A and into the stream 221A-1.

Alternatively, an optical grating coupler 297, e.g. on the substrate 216 may terminate the exposed end 295 of the first input optical waveguide 200A. The optical grating coupler 297 emits the red-detuned optical signal 226A in a direction towards the incoming stream 221A-1 of alkali atoms 221A. The optical grating coupler 297 can be formed by periodic notching of the first input optical waveguide 200A. The periodic notching cause diffraction so that a red-detuned optical signal 226A'-1 is emitted into free space away from the optical grating coupler 297 at an angle to the exterior surface of the optical grating coupler 297 (e.g. the first input optical waveguide 200A that is notched). The diameter of the emitted red-detuned optical signal 226A'-1 increases with distance from the optical grating coupler 297. The angle is dependent upon the dimensions of the gratings, e.g. width, depth, and separation. Alkali atom 221A transfer efficiency is increased by directing the stream 221A-1 of alkali atoms 221A towards the emitted red-detuned optical signal 226A'-1, and directing the red-detuned optical signal 226A'-1 towards the stream 221A-1. Note, the bidirectional coupler embodiment may be implemented with or without using the optical coupler grating embodiment.

Using one of the foregoing techniques, the stream 221A-1 of alkali atoms 221A are effectively funneled from free space towards the optical grating coupler 297. Thus, the red blue optical evanescent trap of the second portion 200A-2 of the first input optical waveguide 200A.

Returning to FIG. 2A, the at least one cooling beam (or signal) is used to diminish movement of the alkali atoms 221A in at least one direction transverse to the direction of movement of the stream 221A-1 along the red blue optical evanescent trap. By doing so, interferometer, and thus gyroscope, efficiency and sensitivity are increased. The transverse axes are orthogonal to each other and to the direction of movement of the stream 221A-1.

The transverse motion can occur along a positive or negative direction of a transverse axis. Thus, to compensate for each such direction, one or two cooling optical beams (or signals) may be applied. When two cooling optical beams are applied, one cooling optical beam is applied in the positive direction and one optical beam is applied in the negative direction. Each such cooling optical beam may be generated by a common or different laser.

To reduce transverse motion in both directions in one axis orthogonal to the direction of travel of the stream 221A-1, the counterpropagating first and second cooling optical beams (or signals) 291A, 291B are applied along a first axis orthogonal to the direction of travel of the stream 221A-1. If the first input optical waveguide 200A is formed on a substrate 216, then the counterpropagating first and second cooing optical beams 291A, 291B may generated by respective lasers; each cooling optical beam is coupled to a unique end of an optical waveguide on the substrate 216 (e.g. on a plane parallel to the surface of the substrate 216) which orthogonally crosses the first input optical waveguide 200A. The counterpropagating first and second cooling optical beams 291A, 291B are configured to be orthogonal to the stream 221A-1.

Further, a single third cooling optical beam (or signal) 291C is applied in free space or through an optical fiber orthogonal to the surface of the substrate 216 (and thus orthogonal to the two counterpropagating optical beams 291A, 291B and the stream 221A-1). The third cooling optical beam 291C and its reflection from the surface of the substrate 216 (a fourth cooling optical beam (or signal) 291D) reduce atom movement in a second axis orthogonal to the direction of travel of the stream 221A-1, and orthogonal to the first orthogonal axis. Alternatively, if no substrate 216 were used the two counterpropagating first and second cooling optical beams 291A, 291B and the single cooling optical beam 291C (and a corresponding counterpropagating cooling optical beam) can be applied through free space and/or through optical fiber orthogonal to the stream 221A-1.

Optionally, the velocity of the alkali atoms 221A in the stream 221A-1 can be adjusted. By selecting the appropriate velocity, interferometer, and thus gyroscope, efficiency and sensitivity are increased.

To adjust the velocity distribution of the alkali atoms 221A in the stream, another pair of fourth and fifth cooling optical beams 291E, 291F can be applied to the stream 221A-1. The fourth and fifth cooling optical beams 291E, 291F and the stream 221A-1 form a plane. The fourth and fifth cooling optical beams 291E, 291F are incident with the stream 221A-1, have vector components parallel to the direction of travel of the stream 221A-1 that are opposite, and may have different or the same absolute values of angles of incidence. However, for pedagogical reasons, an embodiment is described where each of the fourth and fifth cooling optical beams 291E, 291F are incident with the stream 221A-1 at respectively an angle $\Theta$ and an angle $-\Theta$. The frequencies of each of the fourth and fifth cooling optical beams 291E, 291F. The velocity of the stream 221A-1 is equal to $d/(2*k*\cos(\Theta))$, where d is the difference in frequencies of the fourth and fifth cooling optical beams 291E, 291F. The fourth cooling optical beam 291E has a higher frequency than the fifth cooling optical beam 291E, and $k=2*\pi/\lambda$, where $\lambda$ is the average wavelength of the fourth and fifth cooling optical beams 291E, 291F, or is one of the wavelengths of the fourth and fifth cooling optical beams 291E, 291F.

The electronic state of all of the alkali atoms 221A, in the stream 221A in the red blue optical evanescent trap, is set to a single electron state, rather than having a random distribution of electronic states. By setting the electronic state of all of the alkali atoms 221A to a single electronic state, interferometer, and thus gyroscope, efficiency and sensitivity are increased.

To set the electronic state of all the alkali atoms 221a to a single electronic state, an evanescent field of a pump optical beam (or signal) 225A (having a frequency substantially corresponding to the desired electronic ground state of the alkali atoms 221A) is applied to the stream 221A. The pump optical beam 225A is generated by a pump laser 225. The pump optical beam 225A may be applied through free space or an optical waveguide orthogonal to the stream 221A-1. For example, the optical waveguide may be an optical fiber or an optical waveguide 225B in the substrate 216 that is orthogonal and passes through the first input optical waveguide 200A.

A first optical detector 293A, e.g. a photodetector, is placed adjacent to, e.g. above, the intersection of the pump optical beam 225A and the stream 221A. The first optical detector detects the amplitude, AT, of light that is generated by fluorescence by the interaction of the pump optical beams 225A and the stream. AT represents a total population of alkali atoms 221A entering the four ports 299 from the first input optical waveguide 200A (e.g. described elsewhere herein).

At four ports 299 (at the juncture of the first input optical waveguide 200A, the output optical waveguide 200B, and the optical waveguide loop 222), at least one Bragg optical beam (or signal) is applied orthogonal to the stream 221A-1 in the red blue optical evanescent trap. For pedagogical purposes, two counterpropagating Bragg optical beams will be illustrated. First and second counterpropagating Bragg optical beams (or signals) 223A-1, 223B-1 are respectively generated by one or more lasers (e.g. a first Bragg laser 223A and a second Bragg laser 223B). The first and second counterpropagating Bragg optical beams 223A-1, 223B-1 are conveyed to the four ports 299 by optical waveguide or free space. The optical waveguide may be optical fiber or optical waveguide formed on the substrate 216.

The four ports 299 may be implement in different ways. The four ports 299 should be implemented in a manner that does not significantly affect, e.g. disturb, the red blue optical evanescent trap.

Figure 3A:
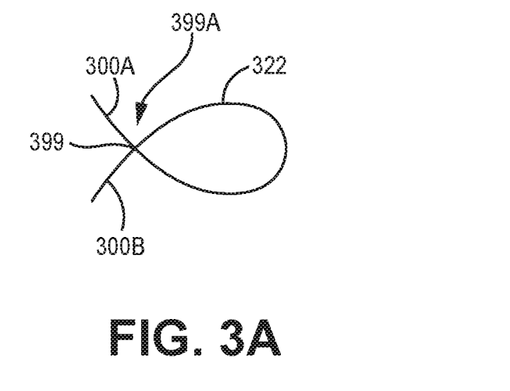
FIG. 3A illustrates one embodiment of four ports.

FIG. 3A illustrates one embodiment of the four ports 399A. In FIG. 3A, the four ports 399A are formed by a connection the output port of the input waveguide 300A, an input port of the output optical waveguide 300B, a first port of the optical waveguide loop 322, and a second port of the optical waveguide loop 322. All four ports are substantially in the same plane. The four ports 399A do not substantially affect the red blue optical evanescent trap or application of the Bragg optical signals 223A-1, 223B-1.

Figure 3B:
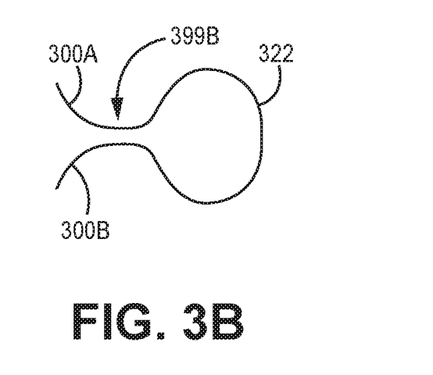
FIG. 3B illustrates another embodiment of the four ports.

FIG. 3B illustrates another embodiment of the four ports 399B. In FIG. 3B, the four ports 399A are formed by a first connecting optical waveguide between the output port of the input waveguide 300A and a second port of the optical waveguide loop 322 being substantially in parallel with and adjacent to a second connecting optical waveguide between the input port of the output optical waveguide 300B and a first port of the optical waveguide loop 322. The first connecting optical waveguide and the second optical connecting waveguide should be close enough to couple an optical signal between one another, but not in physical contact with one another. As a result, a single red blue evanescent optical trap is above at least one exterior surface of the optical waveguides forming the first and second connecting optical wave guides. All four ports are substantially in the same plane. The four ports 399B do not substantially affect the red blue optical evanescent trap or application of the Bragg optical signals 223A-1, 223B-1. The four ports may be implemented in other ways then described above.

Returning to FIG. 2A, each of the counterpropagating Bragg optical beams 223A-1, 223B-1 comprises Bragg optical pulses. When the beams are transmitted through an optical waveguide, the Bragg optical pulses of the counterpropagating Bragg optical beams 223A-1, 223B-1 cross the four ports 299 to create evanescent fields of the counterpropagating Bragg optical beams 223A-1, 223B-1 which are coupled to the alkali atoms 221A (or wave functions) travelling along the four ports 299. When the beams are transmitted through free space, the counterpropagating Bragg optical beams 223A-1, 223B-1 cross the four ports 299 to create fields of the counterpropagating Bragg optical beams 223A-1, 223B-1 which are coupled to the alkali atoms 221A (or wave functions) travelling along the four ports 299.

The Bragg optical pulses are designed to split a wave function of the alkali atoms 221A into two portions which have different motional states, but retain the same electronic state. The amplitude, phase, and frequency of the optical pulses necessary to split the atomic wave function of the alkali atoms into two such portions can be determined using Schrödinger's equation. When split, each portion may have equal or unequal populations with respect to the other portion.

One half of the atomic wave function travels clockwise 222A around the optical waveguide loop 222. The other half of the atomic wave function travels counter-clockwise 222B around the optical waveguide loop 222.

The Bragg optical pulses are also configured to recombine the first and the second wavefunction halves, after they have traversed the optical waveguide loop 222, into recombined alkali atoms, where some recombined alkali atoms exit above and along an exterior surface of the output optical waveguide and other recombined alkali atoms exit above and along an exterior surface of the input optical waveguide.

A measurement optical beam 294 is applied orthogonally to the output optical waveguide 200B. The measurement optical beam 294 is generated by a laser, e.g. the pump laser 225 or a separate laser, and has a frequency substantially corresponding to the desired electronic state of the alkali atoms 221A or to another electronic state of the alkali atoms 221A.

A second optical detector 293B, e.g. a photodetector, is placed adjacent to, e.g. above, the intersection of the measurement optical beam (or signal) 294 and the stream of recombined alkali atoms about the output optical waveguide 200B. The second optical detector 293B detects the amplitude, $A_M$, of light that is generated by fluorescence by the interaction of the measurement optical beam 294 and the recombined alkali atoms of the stream about the output optical waveguide 200B. $A_M$ represents a population of the motional state in the output optical waveguide 200B. (described elsewhere herein). The ratio of the population of the motional states measured by the second optical detector 293B, i.e. in the output optical waveguide 200B, with respect to the total population measured by the first optical detector 293B depends upon the rate of rotation of the optical waveguide loop 222 around the center axis 298.

Optionally, an optical baffle 229 is placed between the first input optical waveguide 200A and the output optical waveguide 200B where one is proximate to the other and proximate to the four port 299. The baffle 229 isolates the half of the atomic wave function of the stream 221A in the output optical waveguide 200B from the pump optical beam 225A, and isolates the other half of the atomic wave function of the stream 221A in the first input optical waveguide 200A from the measurement optical beam 294.

The populations of motional states and the amplitude are related to the phase shift φ by a periodic sinusoidal wave function:

$$\frac{A_M}{A_T} = D + C*\sin^2(\varphi) \text{function}, \qquad \text{(Equation 1)}$$

where C is a constant that depends on a difference in population in a maximum and minimum differences between the two motional states, and D is a constant that depends on background light leaking into the first optical detector 293A and the second optical detector 293B.

Because the change in population (between no rotation and rotation around the center axis) is measured by relating the change in absorption or phase retardation of the third set of optical pulses to the population ratio, the phase shift φ between the two portions of the wave function can be readily determined. Using the Sagnac equation, the rate of rotation (Ω) around the center axis 298 of the optical waveguide loop 222 can be determined:

$$\Omega = \frac{\varphi h}{4\pi m A}, \quad \text{(Equation 2)}$$

where m is the mass of the alkali atom, A is the cross-sectional area enclosed by atomic wave function circulating in the optical waveguide loop 222, and h is Planck's constant.

Figure 4:
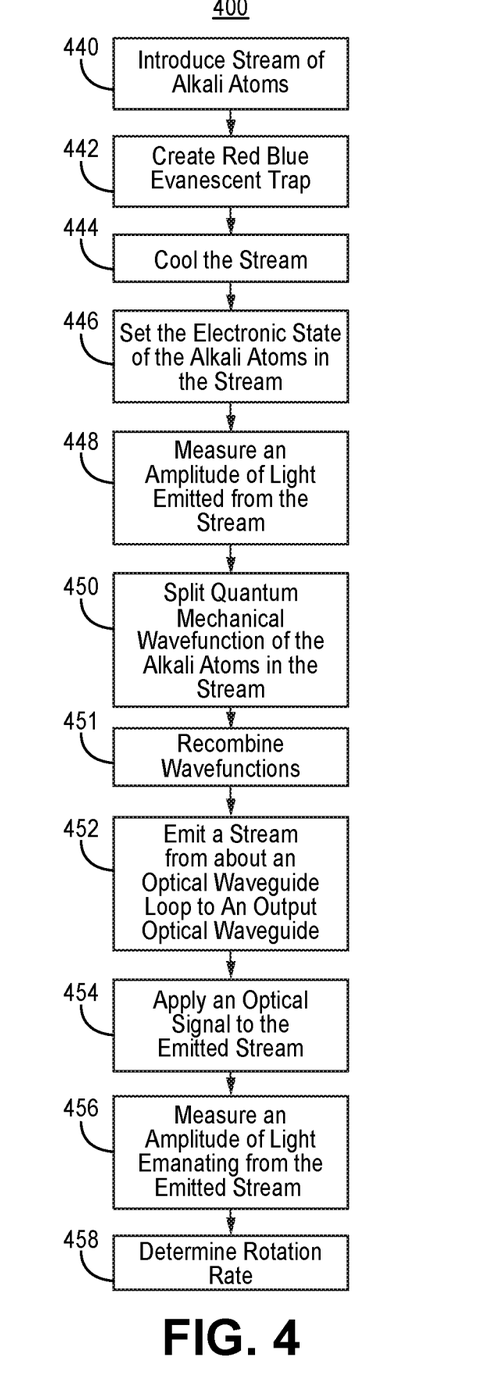
FIG. 4 illustrates an exemplary method of operation of a four port atomic gyroscope.

FIG. 4 illustrates an exemplary method 400 of operation of a four port atomic gyroscope. To the extent the method 400 shown in FIG. 4 is described herein as being implemented in the devices described above with respect to FIGS. 1-3B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Method 400 proceeds to block 440 with introducing a stream of alkali atoms to an exterior surface of an input optical waveguide, e.g. by delivering the stream to a distal end of the input optical waveguide (or a distal end of a portion of the input optical waveguide). Optionally, the stream of alkali atoms may be generated by an atomic trap.

Method 400 continues to block 442 with creating a red blue optical evanescent trap above the surface of the input optical waveguide with the first evanescent field and the second evanescent field, where the streaming alkali atoms travel above parallel to a center axis of the input optical waveguide being suspended in the red blue optical evanescent trap. In exemplary embodiments, the red blue optical evanescent trap is formed by introducing the red-detuned optical signal and a blue-detuned optical signal into the input optical waveguide. The red-detuned optical signal has a first frequency below the resonant atomic frequency of the alkali atoms above the surface of the input optical waveguide. The red-detuned optical signal has a first evanescent field that extends above the input optical waveguide a first distance that is greater than a second distance, the first evanescent field attracting the atoms toward the surface of the input optical waveguide.

The blue-detuned optical signal has a second frequency above the resonant atomic frequency of the atoms above the surface of the input optical waveguide. The blue-detuned optical signal has a second evanescent field that extends above the input optical waveguide a second distance, the second evanescent field repelling the alkali atoms away from the surface of the input optical waveguide.

Method 400 proceeds to block 444 with cooling the stream of alkali atoms in one direction or two opposite directions of one or two axes transverse (or orthogonal) to the center axis of input optical waveguide (and an axis along which the alkali atom stream travels). Further, optionally, cool the stream of alkali atoms in the axis of travel of the stream so that the stream moves at a velocity distribution.

Method 400 proceeds to block 446 with setting the electronic states of the alkali atoms in the moving stream following the red blue optical evanescent trap above the input optical waveguide to a known electronic ground state configuration. For example, this can be accomplished by applying a pump optical signal to the moving stream, where the frequency of the pump optical signal is substantially equal to the frequency of the desired electronic ground state. In exemplary implementations, the known electronic ground state configuration is a lower electronic ground state of a double electronic ground state. In other implementations, the known ground state is a higher electronic ground state of a double electronic ground state. However, any electronic ground state configuration may be used. Method 400 proceeds to block 448 with measuring an amplitude of light emitted from the stream of alkali atoms when their electronic states are set, e.g. by the pump optical signal.

Method 400 proceeds to block 450 with splitting quantum mechanical wavefunctions of the alkali atoms of the stream into at least a stream of a first group of atoms following the red blue evanescent trap above the exterior surface of an optical waveguide loop in a first direction, and a stream of a second group of alkali atoms following the red blue optical evanescent trap above the exterior surface of an optical waveguide loop in a second direction. The second direction is opposite the first direction. The phase of the first group with respect to the phase of the second group depends upon the rate of rotation around the center axis of the optical waveguide loop.

Method 400 proceeds to block 451 with recombining the first wave function half and the second wave function half, after each has traversed the optical waveguide loop, into recombined alkali atoms. Recombination occurs upon the first wavefunction half and the second wave function half travelling around the optical waveguide loop only one time.

Method 400 proceeds to block 452 with emitting the stream of alkali atoms traveling in the first direction from about the optical waveguide loop, e.g. to an output optical waveguide. The population of atoms traveling in the output optical waveguide depends on the relative phase between the first group and second group of atoms rotating around the optical waveguide loop. The stream of alkali atoms travels above the exterior surface of the output optical waveguide. Method 400 proceeds to block 454 applying an optical signal, e.g. the optical pump signal or an optical measurement signal, to the emitted stream of alkali atoms, e.g. traveling along the exterior surface of the output optical waveguide. Method 400 proceeds to block 456 with measuring an amplitude of light emitted from the stream of alkali atoms traveling along the exterior surface of the output optical waveguide when the second optical signal is applied to them. Method 400 proceeds to block 458 with determining a rate of rotation around the center axis of the optical waveguide loop using the light amplitudes measured in blocks 448 and 456, e.g. utilizing the equation set forth herein.

In exemplary embodiments, processing circuitry is configured to control embodiments of a four port atomic gyroscope 220A, and/or to determine rotation rate around the center axis of the optical waveguide loop. In exemplary embodiments, the processing circuitry includes or functions with software programs, firmware or other computer readable instructions for carrying out various methods, process tasks, calculations, and control functions, used in the gyroscopes. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

EXAMPLE EMBODIMENTS

Example 1 includes an apparatus, comprising: an input optical waveguide comprising a first end and a second end, where the first end is configured to receive a stream of alkali atoms; an optical waveguide loop having a first port and a second port, where the first port is coupled to the second end, where the optical waveguide loop has a center axis; a first optical detector configured to measure an amplitude of light emitted from the stream of alkali the atoms when a pump optical signal is applied to the stream of the alkali atoms about the input optical waveguide, where the pump optical signal sets an electronic ground state of the alkali atoms; an output optical waveguide having an end coupled to the second port; wherein the input optical waveguide, the optical waveguide loop, and the output optical waveguide each have at least one exterior surface, where each of the exterior surfaces is configured to have a red blue optical evanescent trap above the corresponding exterior surface, where the red blue optical evanescent trap is configured to transport the stream of the alkali atoms, and where the red blue optical evanescent trap is formed by a red-detuned optical signal and a blue-detuned optical signal; wherein the first port, the second port, the second end, and the end of the output optical waveguide are configured to receive at least one field of at least one Bragg optical beam comprising Bragg optical pulses which are configured to split the alkali atoms into two streams of wavefunction halves, where a stream of a first wavefunction half travels clockwise around the optical waveguide loop, and a stream of a second wavefunction half travels counterclockwise around the optical waveguide loop; wherein the Bragg optical pulses are also configured to recombine the first wavefunction half and the second wavefunction half, after each has traversed the optical waveguide loop, into recombined alkali atoms, where some recombined alkali atoms exit above and along an exterior surface of the output optical waveguide and other recombined alkali atoms exit above and along an exterior surface of the input optical waveguide; and a second optical detector configured to measure an amplitude of light emitted from a stream of the recombined alkali atoms exiting above and along the exterior surface of the output optical waveguide when the pump optical signal or another optical signal is applied to the stream of the recombined alkali atoms exiting above and along the exterior surface of the output optical waveguide, where the number of recombined alkali atoms exiting above and along the exterior surface of the output optical waveguide depends upon a rate of rotation around the center axis of the optical waveguide loop.

Example 2 includes the apparatus of Example 1, wherein after entering the red blue optical evanescent trap about the input optical waveguide, the stream of the alkali atoms about the input optical waveguide is configured to receive at least one cooling optical beam.

Example 3 includes the apparatus of Example 2, wherein the at least one cooling optical beam comprises at least one cooling optical beam configured to cool the stream of the alkali atoms in one direction or two opposite directions of at least one axis orthogonal to a direction of travel of the stream of the alkali atoms.

Example 4 includes the apparatus of any of Examples 2-3, wherein the at least one cooling optical beam comprises two cooling optical beams which form a plane with the stream of the alkali atoms where each of the two cooling optical beams have vector components parallel to the direction of travel of the stream of the alkali atoms where a component of one cooling optical beam is in an opposite direction with respect to a component of the other cooling optical beam; and wherein the velocity of the stream of alkali atoms depends upon the angles of incidence of the two cooling optical beams with respect to the stream of the alkali atoms, the difference in frequencies of the two cooling optical beams, and an average wavelength of the two cooling optical beams.

Example 5 includes the apparatus of any of Examples 1-4, further comprising an optical baffle between the input optical waveguide and the output optical waveguide by the optical waveguide loop.

Example 6 includes the apparatus of any of Examples 1-5, wherein a first connecting optical waveguide between the second end of the input waveguide and the second port of the optical waveguide loop is parallel with, not in contact with, and adjacent to a second connecting optical waveguide between the end of the output optical waveguide and the first port of the optical waveguide loop, where the single red blue evanescent optical trap is above at least one exterior surface of optical waveguides forming both the first and the second connecting optical waveguides.

Example 7 includes the apparatus of any of Examples 1-6, wherein an optical grating is coupled to the first end of the input optical waveguide and is configured to emit a diverging field of the red-detuned optical signal to attract the stream of the alkali atoms to the red-blue optical evanescent trap.

Example 8 includes a method, comprising: introducing a stream of alkali atoms to at least one exterior surface of an input optical waveguide; creating a red blue optical evanescent trap above the at least one exterior surface of the input optical waveguide by introducing a red-detuned optical signal and a blue-detuned optical signal in the input optical waveguide, where the stream of the alkali atoms move parallel to a center axis of the input optical waveguide and are suspended in the red blue optical evanescent trap; setting the electronic states of the alkali atoms in the stream of the alkali atoms to a known electronic ground state configuration by applying, orthogonally to the stream of alkali atoms, a pump optical beam; measuring a first amplitude of light emitted from the stream of the alkali atoms when the atomic states are set by the pump optical beam; splitting quantum mechanical wavefunctions of the alkali atoms of the stream of alkali atoms, by applying at least one Bragg optical beam comprising Bragg optical pulses to the stream of the alkali atoms, into at least a stream of a first wavefunction half moving in the red blue optical evanescent trap above at least one exterior surface of an optical waveguide loop in a first direction, and a stream of a second wavefunction half moving in the red blue optical evanescent trap above the at least one exterior surface of an optical waveguide loop in a second direction, where the second direction is opposite the first direction; recombining the first and second wave function halves, after each has traversed the optical waveguide loop, into recombined alkali atoms; emitting, to an output optical waveguide, a stream of some of the recombined alkali atoms; applying the optical pump signal or another optical measurement signal, to the stream of the some of the recombined alkali atoms moving in the red blue optical evanescent trap above and along at least one exterior surface of the output optical waveguide; measuring a second amplitude of light emitted from the stream of the some of the recombined alkali atoms, moving in the red blue optical evanescent trap above and along the at least one exterior surface of the output optical waveguide, when the optical pump signal or another optical measurement signal is applied; and determining a rotation rate around a center axis of the optical waveguide loop based upon the measured first amplitude and the measured second amplitude.

Example 9 includes the method of Example 8, further comprising applying to the stream of the alkali atoms about the input optical waveguide at least one cooling optical beam in a direction orthogonal to the direction of movement of the stream of the alkali atoms to cool the stream of the alkali atoms in at least one direction orthogonal to the center axis of the input optical.

Example 10 includes the method of any of Examples 8-9, further comprising emitting a diverging field of the red-detuned optical signal to attract the stream of the alkali atoms to the red-blue optical evanescent trap.

Example 11 includes the method of any of Examples 8-10, wherein applying at least one cooling optical beam comprises applying a pair of cooling optical beams which form a plane with the stream of the alkali atoms, where the pair of cooling optical beams have vector components parallel to the direction of travel of the stream of the alkali atoms, where a vector component of one cooling optical beam is in an opposite direction with respect to a vector component of the other cooling optical beam, and where the velocity of the stream of the alkali atoms depends upon the angles of incidence of the two cooling optical beams with respect to the stream of the alkali atoms, the difference in frequencies of the two cooling optical beams, and an average wavelength of the two cooling optical beams.

Example 12 includes the method of any of Examples 8-11, further comprising generating the stream of the alkali atoms in an atomic trap.

Example 13 includes a gyroscope, comprising: an input optical waveguide comprising a first end and a second end, where the first end is configured to receive a stream of alkali atoms; a red-detuned laser optically coupled to the input optical waveguide and configured to generate a red-detuned optical signal; a blue-detuned laser optically coupled to the input optical waveguide and configured to generate a blue-detuned optical signal; an optical waveguide loop having a first port and a second port, where the first port is coupled to the second end, where the optical waveguide loop has a center axis; a first optical detector configured to measure an amplitude of light emitted from the stream of the alkali atoms when a pump optical signal is applied to the stream of the alkali atoms; an input optical waveguide comprising a first end and a second end, where the first end is configured to receive the stream of the alkali atoms; an optical waveguide loop having a first port and a second port, where the first port is coupled to the second end, where the optical waveguide loop has a center axis; a pump laser optically coupled to the input optical waveguide and configured to generate a pump optical signal, where the pump optical signal sets an electronic ground state of the alkali atoms in the stream of the alkali atoms; a first optical detector configured to measure an amplitude of light emitted from the stream of the alkali atoms when the pump optical signal is applied to the stream of the alkali atoms; an output optical waveguide having an end coupled to the second port; wherein the input optical waveguide, the optical waveguide loop, and the output optical waveguide each have at least one exterior surface, where each of the exterior surfaces is configured to have a red blue optical evanescent trap above the exterior surfaces, where the red blue optical evanescent trap is configured to transport the stream of the alkali atoms, and where the red blue optical evanescent trap is formed by the red-detuned optical signal and the blue-detuned optical signal; at least one Bragg laser configured to generate at least one field of at least one Bragg optical beam comprising Bragg optical pulses configured to split the alkali atoms into two streams of wavefunction halves; wherein the first port, the second port, the second end, and the end of the output optical waveguide are configured to receive at least one field of at least one Bragg optical beam comprising Bragg optical pulses which are configured to split the alkali atoms into two streams of wavefunction halves, where a stream of a first wavefunction half travels clockwise around the optical waveguide loop, and a stream of a second wavefunction half travels counterclockwise around the optical waveguide loop; wherein the Bragg optical pulses are also configured to recombine the first and the second wavefunction halves, after each has traversed the optical waveguide loop, into recombined alkali atoms, where some recombined alkali atoms exit above and along an exterior surface of the output optical waveguide and other recombined alkali atoms exit above and along an exterior surface of the input optical waveguide; and a second optical detector configured to measure an amplitude of light emitted from a stream of the recombined alkali atoms exiting above and along the exterior surface of the output optical waveguide when the pump optical signal or another optical signal is applied to the stream of the recombined alkali atoms exiting above and along the exterior surface of the output optical waveguide, where the number of recombined alkali atoms exiting above and along the exterior surface of the output optical waveguide depends upon a rate of rotation around the center axis of the optical waveguide loop.

Example 14 includes the gyroscope of Example 13, further comprising a measurement laser configured to generate the other optical signal applied to the stream of the recombined alkali atoms exiting above and along the exterior surface of the output optical waveguide.

Example 15 includes the gyroscope of any of Examples 13-14, further comprising at least one cooling laser configured to generate at least one cooling optical beam applied to the stream of the alkali atoms after the stream of the alkali atoms enters the red blue optical evanescent trap about the input optical waveguide.

Example 16 includes the gyroscope of Example 15, wherein the at least one cooling optical beam comprises at least one cooling optical beam configured to cool the stream of the alkali atoms in one direction or two opposite directions of at least one axis orthogonal to a direction of travel of the stream of the alkali atoms.

Example 17 includes the gyroscope of any of Examples 15-16, wherein the at least one cooling optical beam comprises two cooling optical beams which form a plane with the stream of the alkali atoms where each of the two cooling optical beams have vector components parallel to the direction of travel of the stream of the alkali atoms where a component of one cooling optical beam is in an opposite direction with respect to a component of the other cooling optical beam; and wherein the velocity of the stream of alkali atoms depends upon the angles of incidence of the two cooling optical beams with respect to the stream of the alkali atoms, the difference in frequencies of the two cooling optical beams, and an average wavelength of the two cooling optical beams.

Example 18 includes the gyroscope of any of Examples 13-17, further comprising an optical baffle between the input optical waveguide and the output optical waveguide by the optical waveguide loop.

Example 19 includes the gyroscope of any of Examples 13-18, wherein a first connecting optical waveguide between the second end of the input waveguide and the second port of the optical waveguide loop is parallel with, not in contact with, and adjacent to a second connecting optical waveguide between the end of the output optical waveguide and the first port of the optical waveguide loop, where the single red blue evanescent optical trap is above at least one exterior surface of optical waveguides forming both the first and second connecting optical waveguides.

Example 20 includes the gyroscope of any of Examples 13-19, wherein an optical grating is coupled to the first end of the input optical waveguide and is configured to emit a diverging field of the red-detuned optical signal to attract the stream of the alkali atoms to the red-blue optical evanescent trap.

Terms of relative position as used in this application are defined based on a plane parallel to the conventional plane or working surface of a layer or substrate, regardless of orientation. The term "horizontal" or "lateral" as used in this application are defined as a plane parallel to the conventional plane or working surface of a layer or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer or substrate, regardless of orientation.

Although specific embodiments have been illustrated and described herein, it will be appreciated by those of ordinary skill in the art that any arrangement, which is calculated to achieve the same purpose, may be substituted for the specific embodiments shown. For example, it is to be understood that a number of different types of lasers could also be used. Therefore, it is manifestly intended that this invention be limited only by the claims and the equivalents thereof.

What is claimed is:

1. An apparatus, comprising:
    an input optical waveguide comprising a first end and a second end, where the first end is configured to receive a stream of alkali atoms;
    an optical waveguide loop having a first port and a second port, where the first port is coupled to the second end, where the optical waveguide loop has a center axis;
    a first optical detector configured to measure an amplitude of light emitted from the stream of alkali atoms when a pump optical signal is applied to the stream of the alkali atoms about the input optical waveguide, where the pump optical signal sets an electronic ground state of the alkali atoms;
    an output optical waveguide having an end coupled to the second port;
    wherein the input optical waveguide, the optical waveguide loop, and the output optical waveguide each have at least one exterior surface, where each of the exterior surfaces is configured to have a red blue optical evanescent trap above the corresponding exterior surface, where the red blue optical evanescent trap is configured to transport the stream of the alkali atoms, and where the red blue optical evanescent trap is formed by a red-detuned optical signal and a blue-detuned optical signal;
    wherein the first port, the second port, the second end, and the end of the output optical waveguide are configured to receive at least one field of at least one Bragg optical beam comprising Bragg optical pulses which are configured to split the alkali atoms into two streams of wavefunction halves, where a stream of a first wavefunction half travels clockwise around the optical waveguide loop, and a stream of a second wavefunction half travels counterclockwise around the optical waveguide loop;
    wherein the Bragg optical pulses are also configured to recombine the first wavefunction half and the second wavefunction half, after each has traversed the optical waveguide loop, into recombined alkali atoms, where some recombined alkali atoms exit above and along an exterior surface of the output optical waveguide and other recombined alkali atoms exit above and along an exterior surface of the input optical waveguide; and
    a second optical detector configured to measure an amplitude of light emitted from a stream of the recombined alkali atoms exiting above and along the exterior surface of the output optical waveguide when the pump optical signal or another optical signal is applied to the stream of the recombined alkali atoms exiting above and along the exterior surface of the output optical waveguide, where the number of recombined alkali atoms exiting above and along the exterior surface of the output optical waveguide depends upon a rate of rotation around the center axis of the optical waveguide loop.

2. The apparatus of claim 1, wherein after entering the red blue optical evanescent trap about the input optical waveguide, the stream of the alkali atoms about the input optical waveguide is configured to receive at least one cooling optical beam.

3. The apparatus of claim 2, wherein the at least one cooling optical beam comprises at least one cooling optical beam configured to cool the stream of the alkali atoms in one direction or two opposite directions of at least one axis orthogonal to a direction of travel of the stream of the alkali atoms.

4. The apparatus of claim 2, wherein the at least one cooling optical beam comprises two cooling optical beams which form a plane with the stream of the alkali atoms where each of the two cooling optical beams have vector components parallel to the direction of travel of the stream of the alkali atoms where a component of one cooling optical beam is in an opposite direction with respect to a component of the other cooling optical beam; and
    wherein the velocity of the stream of alkali atoms depends upon the angles of incidence of the two cooling optical beams with respect to the stream of the alkali atoms, the difference in frequencies of the two cooling optical beams, and an average wavelength of the two cooling optical beams.

5. The apparatus of claim 1, further comprising an optical baffle between the input optical waveguide and the output optical waveguide by the optical waveguide loop.

6. The apparatus of claim 1, wherein a first connecting optical waveguide between the second end of the input waveguide and the second port of the optical waveguide loop is parallel with, not in contact with, and adjacent to a second connecting optical waveguide between the end of the output optical waveguide and the first port of the optical waveguide loop, where the single red blue evanescent optical trap is above at least one exterior surface of optical waveguides forming both the first and the second connecting optical waveguides.

7. The apparatus of claim 1, wherein an optical grating is coupled to the first end of the input optical waveguide and is configured to emit a diverging field of the red-detuned optical signal to attract the stream of the alkali atoms to the red-blue optical evanescent trap.

8. A method, comprising:
introducing a stream of alkali atoms to at least one exterior surface of an input optical waveguide;
creating a red blue optical evanescent trap above the at least one exterior surface of the input optical waveguide by introducing a red-detuned optical signal and a blue-detuned optical signal in the input optical waveguide, where the stream of the alkali atoms move parallel to a center axis of the input optical waveguide and are suspended in the red blue optical evanescent trap;
setting the electronic states of the alkali atoms in the stream of the alkali atoms to a known electronic ground state configuration by applying, orthogonally to the stream of alkali atoms, a pump optical beam;
measuring a first amplitude of light emitted from the stream of the alkali atoms when the atomic states are set by the pump optical beam;
splitting quantum mechanical wavefunctions of the alkali atoms of the stream of alkali atoms, by applying at least one Bragg optical beam comprising Bragg optical pulses to the stream of the alkali atoms, into at least a stream of a first wavefunction half moving in the red blue optical evanescent trap above at least one exterior surface of an optical waveguide loop in a first direction, and a stream of a second wavefunction half moving in the red blue optical evanescent trap above the at least one exterior surface of an optical waveguide loop in a second direction, where the second direction is opposite the first direction;
recombining the first and second wave function halves, after each has traversed the optical waveguide loop, into recombined alkali atoms;
emitting, to an output optical waveguide, a stream of some of the recombined alkali atoms;
applying the optical pump signal or another optical measurement signal, to the stream of the some of the recombined alkali atoms moving in the red blue optical evanescent trap above and along at least one exterior surface of the output optical waveguide;
measuring a second amplitude of light emitted from the stream of the some of the recombined alkali atoms, moving in the red blue optical evanescent trap above and along the at least one exterior surface of the output optical waveguide, when the optical pump signal or another optical measurement signal is applied; and
determining a rotation rate around a center axis of the optical waveguide loop based upon the measured first amplitude and the measured second amplitude.

9. The method of claim 8, further comprising applying to the stream of the alkali atoms about the input optical waveguide at least one cooling optical beam in a direction orthogonal to the direction of movement of the stream of the alkali atoms to cool the stream of the alkali atoms in at least one direction orthogonal to the center axis of the input optical.

10. The method of claim 8, further comprising emitting a diverging field of the red-detuned optical signal to attract the stream of the alkali atoms to the red-blue optical evanescent trap.

11. The method of claim 8, wherein applying at least one cooling optical beam comprises applying a pair of cooling optical beams which form a plane with the stream of the alkali atoms, where the pair of cooling optical beams have vector components parallel to the direction of travel of the stream of the alkali atoms, where a vector component of one cooling optical beam is in an opposite direction with respect to a vector component of the other cooling optical beam, and where the velocity of the stream of the alkali atoms depends upon the angles of incidence of the two cooling optical beams with respect to the stream of the alkali atoms, the difference in frequencies of the two cooling optical beams, and an average wavelength of the two cooling optical beams.

12. The method of claim 8, further comprising generating the stream of the alkali atoms in an atomic trap.

13. A gyroscope, comprising:
an input optical waveguide comprising a first end and a second end, where the first end is configured to receive a stream of alkali atoms;
a red-detuned laser optically coupled to the input optical waveguide and configured to generate a red-detuned optical signal;
a blue-detuned laser optically coupled to the input optical waveguide and configured to generate a blue-detuned optical signal;
an optical waveguide loop having a first port and a second port, where the first port is coupled to the second end, where the optical waveguide loop has a center axis;
a first optical detector configured to measure an amplitude of light emitted from the stream of the alkali atoms when a pump optical signal is applied to the stream of the alkali atoms;
a pump laser optically coupled to the input optical waveguide and configured to generate a pump optical signal, where the pump optical signal sets an electronic ground state of the alkali atoms in the stream of the alkali atoms;
an output optical waveguide having an end coupled to the second port; wherein the input optical waveguide, the optical waveguide loop, and the output optical waveguide each have at least one exterior surface, where each of the exterior surfaces is configured to have a red blue optical evanescent trap above the exterior surfaces, where the red blue optical evanescent trap is configured to transport the stream of the alkali atoms, and where the red blue optical evanescent trap is formed by the red-detuned optical signal and the blue-detuned optical signal;
at least one Bragg laser configured to generate at least one field of at least one Bragg optical beam comprising Bragg optical pulses configured to split the alkali atoms into two streams of wavefunction halves;

wherein the first port, the second port, the second end, and the end of the output optical waveguide are configured to receive at least one field of at least one Bragg optical beam comprising Bragg optical pulses which are configured to split the alkali atoms into two streams of wavefunction halves, where a stream of a first wavefunction half travels clockwise around the optical waveguide loop, and a stream of a second wavefunction half travels counterclockwise around the optical waveguide loop;

wherein the Bragg optical pulses are also configured to recombine the first and the second wavefunction halves, after each has traversed the optical waveguide loop, into recombined alkali atoms, where some recombined alkali atoms exit above and along an exterior surface of the output optical waveguide and other recombined alkali atoms exit above and along an exterior surface of the input optical waveguide; and a second optical detector configured to measure an amplitude of light emitted from a stream of the recombined alkali atoms exiting above and along the exterior surface of the output optical waveguide when the pump optical signal or another optical signal is applied to the stream of the recombined alkali atoms exiting above and along the exterior surface of the output optical waveguide, where the number of recombined alkali atoms exiting above and along the exterior surface of the output optical waveguide depends upon a rate of rotation around the center axis of the optical waveguide loop.

14. The gyroscope of claim 13, further comprising a measurement laser configured to generate the other optical signal applied to the stream of the recombined alkali atoms exiting above and along the exterior surface of the output optical waveguide.

15. The gyroscope of claim 13, further comprising at least one cooling laser configured to generate at least one cooling optical beam applied to the stream of the alkali atoms after the stream of the alkali atoms enters the red blue optical evanescent trap about the input optical waveguide.

16. The gyroscope of claim 15, wherein the at least one cooling optical beam comprises at least one cooling optical beam configured to cool the stream of the alkali atoms in one direction or two opposite directions of at least one axis orthogonal to a direction of travel of the stream of the alkali atoms.

17. The gyroscope of claim 15, wherein the at least one cooling optical beam comprises two cooling optical beams which form a plane with the stream of the alkali atoms where each of the two cooling optical beams have vector components parallel to the direction of travel of the stream of the alkali atoms where a component of one cooling optical beam is in an opposite direction with respect to a component of the other cooling optical beam; and wherein the velocity of the stream of alkali atoms depends upon the angles of incidence of the two cooling optical beams with respect to the stream of the alkali atoms, the difference in frequencies of the two cooling optical beams, and an average wavelength of the two cooling optical beams.

18. The gyroscope of claim 13, further comprising an optical baffle between the input optical waveguide and the output optical waveguide by the optical waveguide loop.

19. The gyroscope of claim 13, wherein a first connecting optical waveguide between the second end of the input waveguide and the second port of the optical waveguide loop is parallel with, not in contact with, and adjacent to a second connecting optical waveguide between the end of the output optical waveguide and the first port of the optical waveguide loop, where the single red blue evanescent optical trap is above at least one exterior surface of optical waveguides forming both the first and second connecting optical waveguides.

20. The gyroscope of claim 13, wherein an optical grating is coupled to the first end of the input optical waveguide and is configured to emit a diverging field of the red-detuned optical signal to attract the stream of the alkali atoms to the red-blue optical evanescent trap.

* * * * *